United States Patent
Sarrelongue et al.

(10) Patent No.: US 6,274,230 B1
(45) Date of Patent: Aug. 14, 2001

(54) ARTICLES OF COMPOSITE CONSTRUCTION AND METHOD OF PRODUCING PATTERNS THEREON

(75) Inventors: Didier Sarrelongue, Park City; Edwin A. Rowsell, South Jordan; Philip A. Dixon, Salt Lake City, all of UT (US); Peter Yan, Arcadia, CA (US)

(73) Assignee: Jas. D. Easton, Inc., Van Nuys, CA (US)

( * ) Notice: Subject to any disclaimer, the term of this patent is extended or adjusted under 35 U.S.C. 154(b) by 0 days.

(21) Appl. No.: 09/340,278

(22) Filed: Jun. 25, 1999

(51) Int. Cl.[7] ................................................... B32B 17/12
(52) U.S. Cl. .................................. 428/293.7; 428/293.4; 428/298.4; 428/299.1; 428/299.11; 428/299.7; 428/301.4; 428/371; 428/375; 428/377
(58) Field of Search ........................................ 428/252, 236, 428/36.2, 34.5, 34.7, 377, 395, 398, 399, 293.4, 293.7, 297.4, 298.1, 298.4, 299.1, 299.4, 299.7, 301.4, 364, 371, 375

(56) References Cited

U.S. PATENT DOCUMENTS

| | | | |
|---|---|---|---|
| 4,735,850 | * | 4/1988 | Ehman .................................. 428/283 |
| 4,820,568 | * | 4/1989 | Harpell et al. ........................ 428/113 |
| 4,886,682 | * | 12/1989 | Singh et al. .......................... 427/56.1 |
| 5,035,764 | * | 7/1991 | Blake .................................... 156/327 |
| 5,242,720 | * | 9/1993 | Blake ................................... 428/34.5 |

\* cited by examiner

*Primary Examiner*—Merrick Dixon
(74) *Attorney, Agent, or Firm*—Roth & Goldman

(57) ABSTRACT

A process for producing sharp surface visible patterns on composite articles formed of resin coated reinforcing strands employs a liquid uncured resin having a coloring component therein to produce an opaque resin of light color to mask the color of the reinforcing strands. An absorbent surface veil is applied to the surface of the article before curing the resin to produce an absorbent opaque surface layer of light color into which a pattern of contrasting color is then transferred by sublimating an ink or dye pattern from a pattern carrier into the opaque resin impregnated surface layer and veil. Articles ready for application of the surface pattern thereto by sublimation may be produced using pultrusion or hand lay-up methods. Distribution of the surface pattern partially or entirely through the thickness of the surface layer results in an article having a surface in which the pattern remains sharply visible despite surface wear.

14 Claims, 3 Drawing Sheets

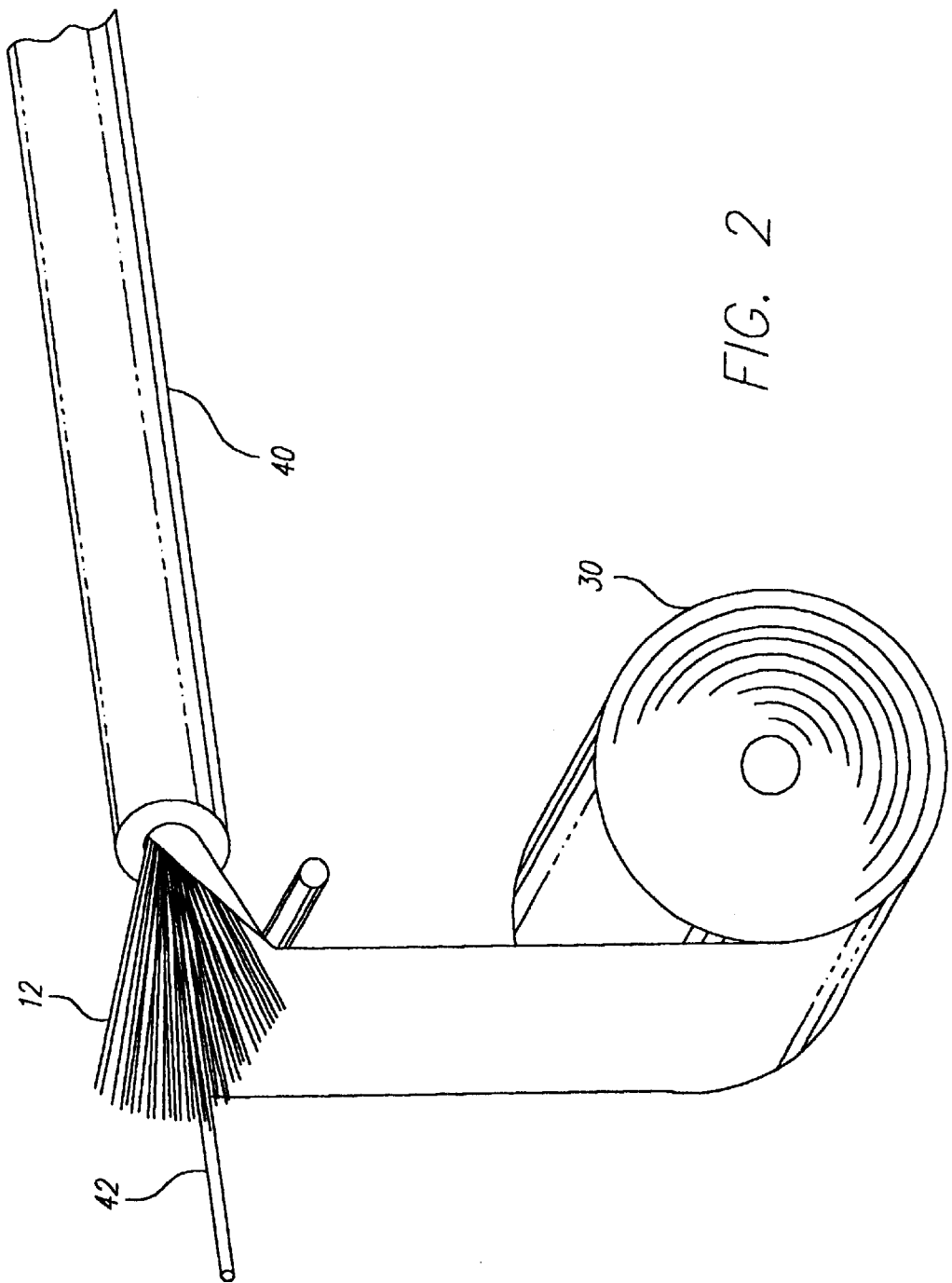

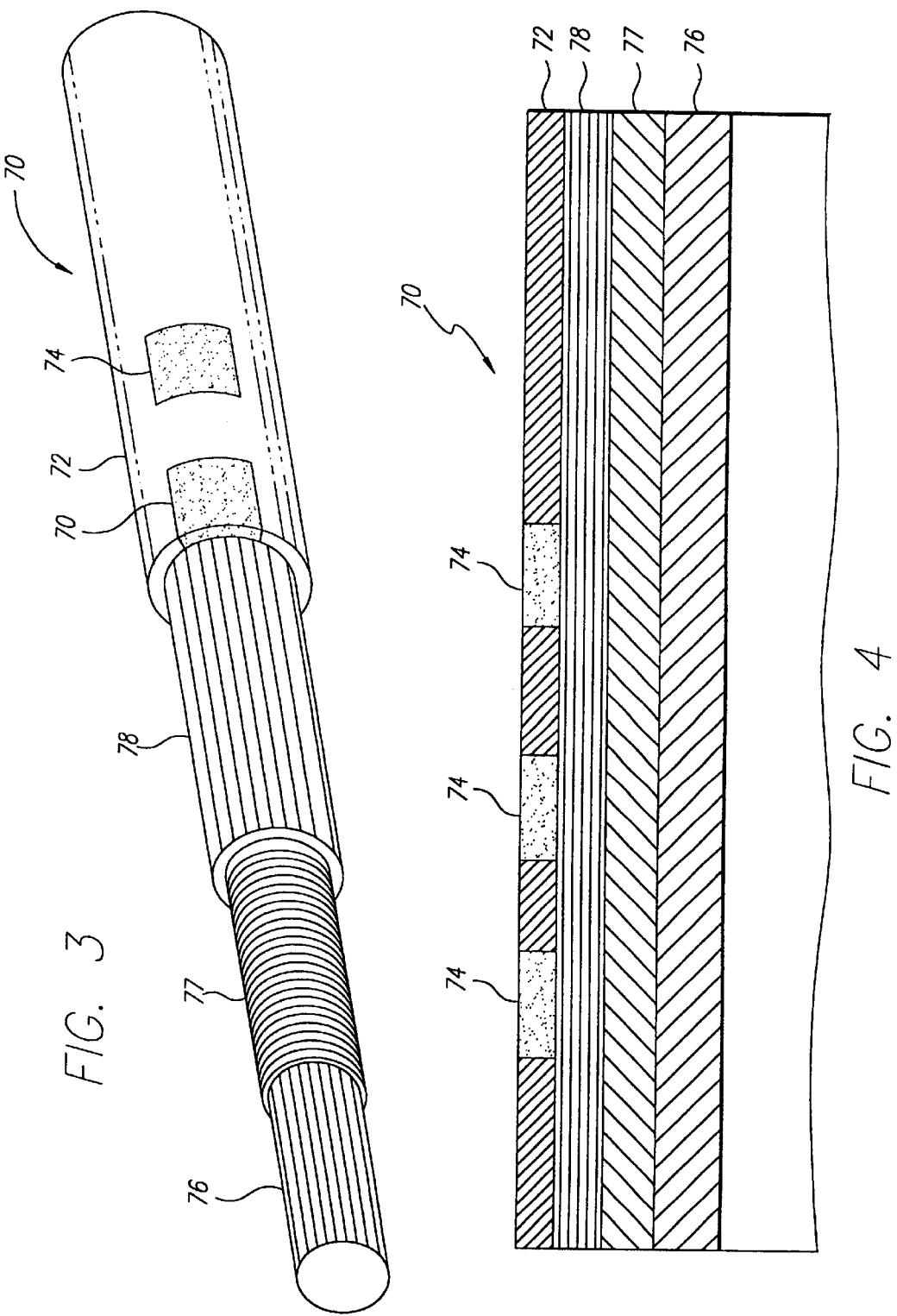

ARTICLES OF COMPOSITE CONSTRUCTION AND METHOD OF PRODUCING PATTERNS THEREON

CROSS REFERENCE TO RELATED APPLICATIONS IF ANY

None.

BACKGROUND OF THE INVENTION AND PRIOR ART

1. Field of the Invention

The present invention relates to the application of visually sharp and distinct patterns to composite articles during manufacture thereof and, more specifically, to the manufacture of sporting articles such as arrow shafts, golf shafts, baseball bats, hockey sticks, ski poles, archery stabilizers and bike tubing having surface patterns such as manufacturers' names and logos, etc. thereon.

2. Prior Art

The application of surface patterns to articles subject to surface wear, particularly target arrow shafts or the application of camouflage patterns to hunting arrow shafts, is ordinarily accomplished by surface painting of the article or by application of surface decals and artwork thereto. If the articles are made of metal having a somewhat porous metal oxide surface coating such as is produced by anodizing for example, surface patterns have been applied by face-to-face contact of the surface of the article with a pattern carrier on which patterns produced by sublimating ink or dye are provided. The sublimation process has not heretofore been applicable to the surface of articles made of composite materials such as carbon fiber reinforced epoxy resin since such articles first of all have a dark, almost black, surface coloration against which patterns of contrasting color, if applied, will not be particularly visible and, secondly, the surface of composite particles is non-porous and therefore non-absorbent and is thus unsuitable for application of patterns using a sublimation process.

Continuous formation of composite articles using pultrusion processes is well known for example from U.S. Pat. No. 5,122,417 issued Jun. 16, 1992 to Murakami, et al. As disclosed therein, products of circular and non-circular cross-sectional contours manufactured by impregnating fiber tows or rovings with a resin and drawing them into a die to form an article of predetermined size and shape is used to produce a variety of high-strength articles.

SUMMARY OF THE INVENTION

The present invention provides a process for producing patterns on composite articles formed of resin coated reinforcing strands comprising the steps of:

a) providing a plurality of reinforcing strands having a dark color;

a) providing a liquid uncured resin having a coloring component therein to produce an opaque resin of light color;

c) coating said strands with said resin to at least partially mask said dark color with said light color;

d) forming an article of desired shape from said resin coated strands;

f) applying an absorbent surface veil of color lighter than said dark color to a surface of said article before curing said resin;

g) allowing said uncured resin to impregnate said surface veil;

h) curing said resin component to provide said article having an absorbent opaque surface layer of said light color comprised of said veil and cured resin component impregnated therein; and i) applying a pattern of contrasting color to said surface layer by sublimating said pattern from a pattern carrier into said opaque resin impregnated surface layer.

The present invention further provides a composite article having at least one layer formed of reinforcing strands and a cured resin having a coloring component therein to produce an opaque resin of light color which coats said strands, said article having a surface layer comprised of a resin impregnated surface veil in which said reinforcing strands in said at least one layer underlying said surface layer are at least partially masked by said light color of said resin, said surface layer further including a color pattern sublimated from a pattern carrier extending substantially into said opaque resin impregnated surface veil.

BRIEF DESCRIPTION OF THE DRAWINGS

FIG. 2 is an enlarged view of a forming die and feeding of a surface veil therein.

FIG. 3 is a perspective view of a multi-layer tubular article such as an arrow shaft.

FIG. 4 is an enlarged cross-section of an article having composite layers and a surface layer and pattern extending therein.

DESCRIPTION OF THE PREFERRED EMBODIMENT

Figure 1:
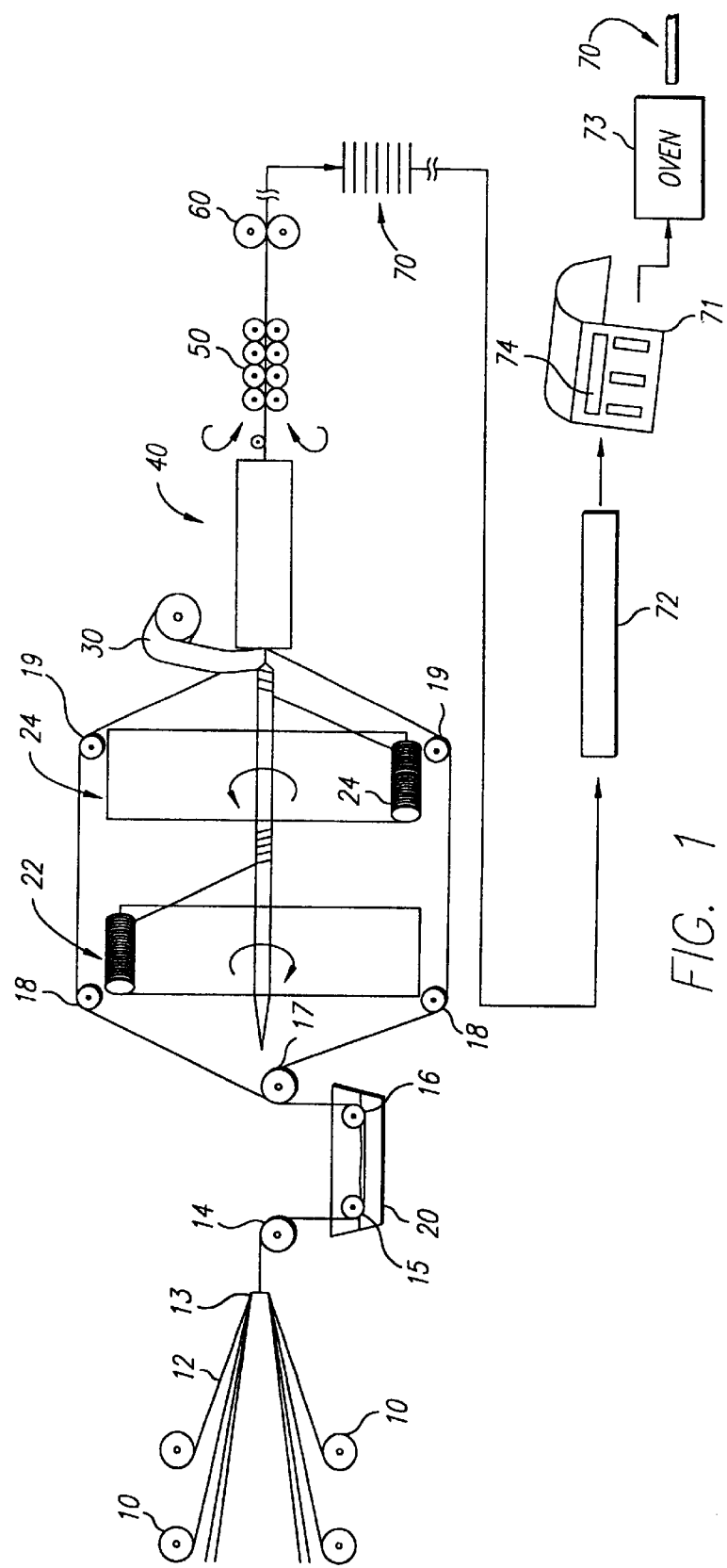
FIG. 1 is a schematic diagram of a continuous pultrusion process for forming composite articles and showing sublimation of a pattern into a specially prepared outer surface layer of the formed article.

FIG. 1 schematically illustrates a continuous pultrusion process for forming composite articles which includes a plurality of spools 10 each holding a supply of reinforcing strands 12 such, for example, as carbon fiber, glass fiber, aramid, Kevlar, Vectran, polyethylene fibers and the like. The individual strands 12 of reinforcing fiber are fed from the spools 10 through a guide 13 following which strands 12 which are to be aligned parallel with the pull axis pass over a series of directional rollers 14, 15, 16, 17, 18 whereby they are first immersed in a resin bath 20, preferably of thermosetting resin such as vinylester or epoxy, which thoroughly coats the strands 12. The coated strands 12 then emerge from the bath 20 and pass over the rollers 17, 18, 19 to the entrance of a forming die 40 through which the strands are pulled by any suitable puller 50 which may be comprised of opposed driven rollers or continuous belts, hand over hand pullers, etc. Optionally, one or more strand winding heads 22, 24 are provided for winding additional strands 12 helically around a mandrel 42 coincident with the pull axis at a desired pitch in either or both of a clockwise and counterclockwise direction to form separate layers of strands oriented in different directions as desired. The forming die 40 may also include a centrally positioned mandrel 42 (FIG. 2) if tubular articles such as arrow shafts or golf shafts are to be formed. In the arrangement shown, the helical strand winding heads 22, 24 wind the inner layer or layers of strands of a tubular article to be formed and the longitudinal strands 12 are subsequently placed onto the inner helically wound layer or layers of strands before the strands enter the die 40. Liquid resin on the longitudinal strands thus is forced into the interstices between the helical coils to coat the inner strand layers. Alternatively, it is of course possible to form tubular or solid articles having longitudinally arranged strands wrapped with an outer helical layer or layers of strands by passing resin coated strands directly from the bath 20 centrally of the winding heads 22, 24 to the entrance of the die 40 instead of around the winding heads over the rollers 18, 19 as shown in FIG. 1.

At the upstream end of the forming die 40 is at least one supply roll 30 of an absorbent thin (2–50 mils) surface veil material generally of matted non-woven filaments, which is fed to the forming die 40 proximate the continuously moving resin impregnated reinforcing strands 12. The wet uncured resin on the strands 12 impregnates the veil 30 as it is fed into and through the forming die 40. Although a single spool 30 of veil material is shown, persons skilled in the art will appreciate that multiple spools of veil material can be equally spaced around the continuously moving resin coated strands 12 at the entrance to the forming die 40 to apply multiple surface veils to the product to more fully cover the surface thereof with one or more veils. The use of surface veils for forming composite products is known, such veils being commonly used in pultrusion, mandrel winding, and lay-up formation of various products including flat panels and other shapes as well as circular and non-circular cross-section elongated products. Veils suitable for use in the present invention generally comprise absorbent surface veils of fibers of polyester, polyamide, glass and/or nylon.

Since it is well known that many reinforcing fibers, particularly carbon fibers, are of a dark substantially black color, the liquid resin bath 20, preferably of epoxy thermosetting resin which is ordinarily of a yellow or amber color, is supplemented with a coloring component additive to produce an opaque resin of relatively lighter color and of viscosity sufficient to at least partially mask the relatively dark color of the carbon reinforcing strands 12. Any one or more of various known resin coloring components can be used for this purpose. The bundled resin coated product strands 12 emerging from the bath 20 thus have a substantially light surface color such as white or light gray rather than the dark almost black color of the carbon reinforcing strands which would appear in absence of the coloring component.

The surface veil material from the roll or rolls 30 is also of a light color preferably of about the same reflectivity as the color of the resin coated surface of the reinforcing strands 12 to provide a surface layer on the resulting product which is both absorbent and opaque and is comprised of the veil 30 itself as well as the resin and coloring component from the bath 20 impregnated therein and which is now suitable for application of a surface pattern of contrasting color by a sublimation process in which the pattern is sublimated into and through a substantial portion of the thickness of the opaque resin impregnated surface layer of the article.

The product 70, upon emerging from the die 40 which is of a length calculated to result in substantially complete curing of the resin in the die 40, may also be heated and/or the die 40 itself may be heated to reduce the resin curing time as is well known in the art.

Downstream of the puller 50 is a cutter 60 which cuts the finished product 70 into suitable lengths following which the product having the absorbent opaque surface layer 72 of light color comprised of the surface veil and cured resin and coloring component impregnated therein is suitable for application of a pattern 74 of contrasting color thereto.

Referring now to FIGS. 1, 3 and 4, the surface pattern 74, which may be sharp resolution graphic source and product identifiers, logos, camouflage patterns or the like is now applied to the product 70 by placing a carrier sheet 71 having the desired pattern 74 thereon comprised of a sublimating dye or ink into face-to-face contact with the absorbent opaque surface layer 72 of the product 70 following which the product 70 and pattern carrier 71 are heated in an oven 73 to a temperature and time adequate to sublimate the pattern 74 substantially completely through the thickness of the opaque resin impregnated surface layer 72 of the composite product 70.

The resulting product has a sharp well defined pattern 74 of color which sharply contrasts with the color of the product surface layer 72 and the pattern extends preferably through the entire thickness of the resin impregnated surface layer 72 so that wear of the surface layer of the product during use has little effect on the visibility of the surface pattern 74 which has been applied to the product by the sublimation process.

It will be appreciated that the application of the pattern 74 to the surface layer 72 by use of a sublimation process preferably takes place at a temperature and for a time easily determined by those skilled in the art depending on the thickness of the surface layer 72 and the amount of the surface layer which is to be penetrated by the pattern 74. The pattern may thus be sublimated through only the desired portion or through the entire thickness of the surface layer 72 as desired. In the broadest aspects of the invention, the pattern need not be sublimated through the entire thickness of the surface layer.

Tubular articles such as arrow shafts may have a resin impregnated surface layer 72 including the veil 30 and pattern 74 sublimated therein which has a thickness not in excess of about 0.010 inches. The pattern may be sublimated into the surface layer by application of heat for a time necessary to achieve sublimation of the pattern partially or completely through the thickness of the surface layer as desired. Other sporting articles such as golf shafts and baseball bats or other tubular or non-tubular shaped articles such as flat panels may have a somewhat thicker opaque surface layer wherein it may be desired not to sublimate the pattern through the entire thickness of the surface layer.

It will also be appreciated that high performance arrow shafts produced according to the invention may have very thin wall thicknesses of as little as 0.035" or even as little as 0.020" with a very thin surface layer having a thickness not in excess of about 0.007" with the surface pattern sublimated through the entire thickness of the surface layer. The sublimated pattern 74 nevertheless survives wear of the surface layer 72 without material deterioration of the pattern unlike surface coated arrow shafts such as those having paint and decals which rapidly wear away through use.

While the invention is primarily concerned with articles purely of composite construction, the process described is equally applicable to layered articles which may include a metal substrate layer 76 covered by one or multiple composite layers 77, 78 (FIGS. 3 and 4) in which the reinforcing strands are arranged in a plurality of different directions (e.g. helical for layer 77 and longitudinal for layer 78 as desired to enhance compression, bending and torsional resistance of the article as desired. Further, the teachings in the invention are equally applicable to tubular articles having a substantially constant outside diameter such as most arrow shafts as well as to tubular articles having a variable outside diameter such as golf shafts and baseball bats.

Additionally, while the invention has been primarily described with reference to a continuous pultrusion composite article forming process and apparatus, the teachings of the invention are equally applicable to non-continuous manufacturing of composite articles through the use of a pre-preg composite material layer or layers comprised of reinforcing strands and uncured resin which may be compressed or wrapped individually onto a mandrel to form tubular articles which are subsequently wrapped with the surface veil and heat cured in an oven prior to application of the pattern by the sublimation technique described above.

Persons skilled in the art will appreciate that various modifications of the preferred embodiment may be made without departing from the teachings herein and that the scope of protection is defined by the claims which follow.

What is claimed is:

1. A composite article having at least one layer formed of reinforcing strands and a cured resin having a coloring component therein to produce an opaque resin of light color which coats said strands, said article having a surface layer comprised of surface veil impregnated with said cured resin and in which said reinforcing strands in said at least one layer underlying said surface layer are at least partially masked by said light color of said resin, said surface layer and said layer underlying said surface layer being of substantially the same said light color, said surface layer further including a color pattern which contrasts with said light color sublimated from a pattern carrier extending substantially into said surface veil impregnated with said cured resin.

2. The article of claim 1, wherein said pattern extends substantially through said resin impregnated surface veil.

3. The article of claim 1, wherein said reinforcing strands are selected from the class consisting of carbon, glass, aramid (Kevlar), Vectran and polyethylene.

4. The article of claim 3, wherein said resin is thermosetting epoxy.

5. The article of claim 4, further including opaque particles uniformly dispersed in said resin to produce said opaque resin of light color.

6. The article of claim 4, wherein said veil is selected from the class consisting of: polyester, polyamide and glass fibers.

7. The article of claim 6, wherein said article is tubular.

8. The article of claim 7, wherein said strands of said at least one layer are unidirectionally arranged with respect to a central axis of said tubular article.

9. The article of claim 7, wherein said article has at least one layer of said strands which is helically arranged with respect to a central axis of said tubular article, said helically arranged strand layer underlying said layer of unidirectionally arranged strands.

10. The article of claim 7, wherein said article has multiple layers of helically arranged strands wound at differing angles with respect to an axis of said tubular article.

11. The article of claim 7, wherein said wherein article further comprises a metal substrate underlying said first layer.

12. The article of claim 7, comprising an arrow shaft.

13. The article of claim 12, wherein said pattern is camouflage.

14. The article of claim 7, comprising a shaft of variable outside diameter.

* * * * *